UNITED STATES PATENT OFFICE

WILHELM ECKERT AND CARL ERICH MÜLLER, OF FRANKFORT-ON-MAIN-HOCHST, GERMANY, ASSIGNORS TO GENERAL ANILINE WORKS, INC., OF NEW YORK, N. Y., A CORPORATION OF DELAWARE

DYED CELLULOSE ESTERS OR ETHERS AND PROCESS OF PRODUCING THE DYEINGS

No Drawing. Application filed January 5, 1929, Serial No. 330,613, and in Germany January 25, 1928.

The present invention relates to cellulose esters or ethers showing greenish-yellow tints and to a process of producing the dyeings.

We have found that derivatives, non-sulfonated in the nuclei, of 4-amino-1.8-naphthalic acid of the following general formula:

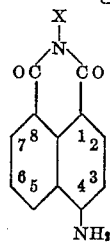

wherein X stands for hydrogen, alkyl, aralkyl or an isocyclic hydrocarbon residue dye cellulose esters or ethers, especially acetate silk, valuable deep yellow tints having a greenish hue. The dyeings partly show a beautiful green fluorescence.

The cellulose esters or ethers can be dyed with the said naphthalic acid derivatives in the usual manner in a colloidal solution or an aqueous suspension, with or without the addition of a protective colloid, a salt, an acid or an alkali.

The 4-amino-1.8-naphthalic acid derivatives of the above stated general formula are obtainable by causing 4-amino-1.8-naphthalic acid anhydride to react with ammonia or with an amine of the aliphatic or isocyclic series.

The following examples serve to illustrate our invention but are not intended to limit it thereto:

(1) 1 kilo of acetate silk is dyed in a dyebath of 30-40 liters, containing 20 g. of the dyestuff 4-amino-1.8-naphthalic acid-ethylimide of the formula:

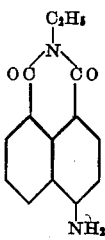

in a finely subdivided form, for 3/4 of an hour at a temperature between 70° C. and 75° C. while adding a small quantity of soap.

In this manner a greenish yellow tint of excellent clearness and of an intense greenish flourescence is obtained.

(2) When using instead of the dyestuff referred to in Example 1 an equivalent quantity of 4-amino-1.8-naphthalic-2' methylphenylimide of the formula:

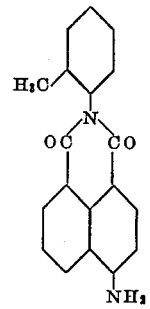

there is likewise obtained a greenish-yellow dyeing of similar properties.

The compounds of the following constitutions yield similar dyeings on celluose esters and cellulose ethers, namely:

(1) the compound of the constitutional formula:

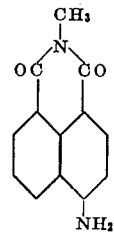

obtainable from 4-amino-1.8-naphthalic-acid-anyhydride and methylamine;

(2) the compound of the constitutional formula:

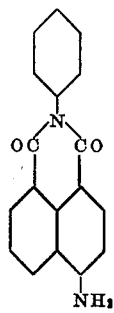

obtainable from 4-amino-1.8-naphthalic-acid-anhydride and aniline;

(3) the compound of the constitutional formula:

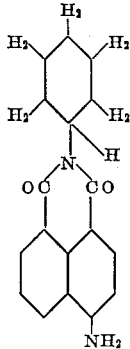

obtainable from 4-amino-1.8-naphthalic-acid-anhydride and cyclohexylamine;

(4) the compound of the constitutional formula:

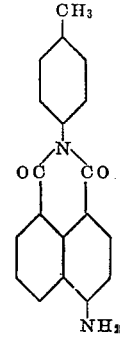

obtainable from 4-amino-1.8-naphthalic-acid-anhydride and 4-methyl-1-aminobenzene;

(5) the compound of the constitutional formula:

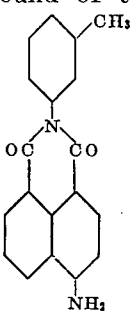

obtainable from 4-amino-1.8-naphthalic-acid-anhydride and 5-methyl-1-aminobenzene;

(6) the compound of the constitutional formula:

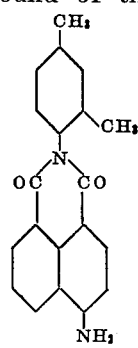

obtainable from 4-amino-1.8-naphthalic-acid-anhydride and 4.6-dimethyl-1-aminobenzene;

(7) the compound of the constitutional formula:

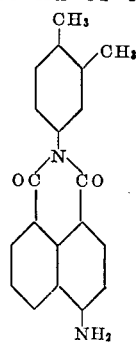

obtainable from 4-amino-1.8-naphthalic-acid-anhydride and 4.5-dimethyl-1-aminobenzene;

(8) the compound of the constitutional formula:

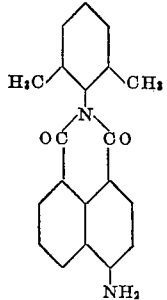

obtainable from 4-amino-1.8-naphthalic-acid-anhydride and 2.6-dimethyl-1-aminobenzene;

(9) the compound of the constitutional formula:

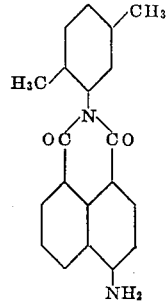

obtainable from 4-amino-1.8-naphthalic-acid-anhydride and 2.5-dimethyl-1-aminobenzene;

(10) the compound of the constitutional formula:

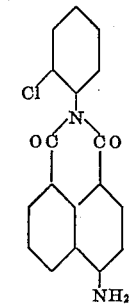

obtainable from 4-amino-1.8-naphthalic acid-anhydride and 2-chloro-1-aminobenzene;

(11) the compound of the constitutional formula:

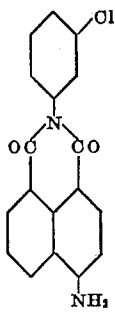

obtainable from 4-amino-1.8-naphthalic-acid-anhydride and 5-chloro-1-aminobenzene;

(12) the compound of the constitutional formula:

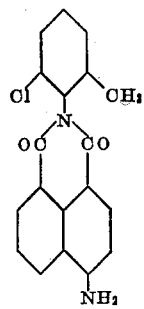

obtainable from 4-amino-1.8-naphthalic-acid-anhydride and 2-chloro-6-methyl-1-aminobenzene.

The before-mentioned derivatives of the 4-amino-1.8-naphthalic acid are only a part of the derivatives of the above stated general formula which we have found to be suitable for dyeing cellulose esters and cellulose ethers.

In the following claims 1–6 the expression "an organic substitution product of cellulose" is to be understood as comprising "cellulose esters and cellulose ethers".

We claim:

1. The process, which comprises dyeing an organic substitution product of cellulose with a compound, non-sulfonated in the nuclei, of the general formula:

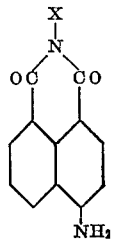

wherein X stands for hydrogen, alkyl, aralkyl or an isocyclic hydrocarbon residue.

2. The process which comprises dyeing an organic substitution product of cellulose with a compound, non-sulfonated in the nuclei, of the general formula:

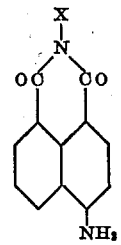

wherein X stands for alkyl or aryl.

3. The process which comprises dyeing an organic substitution product of cellulose with a compound, non-sulfonated in the nuclei, of the general formula:

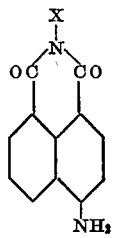

wherein X stands for alkyl or a phenyl residue.

4. The process which comprises dyeing an organic substitution product of cellulose with a compound of the general formula:

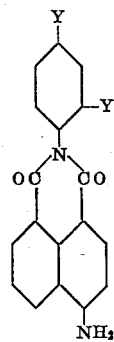

wherein Y stands for hydrogen or $CH_3$.

5. The process which comprises dyeing an organic substitution product of cellulose with the 4-amino-1.8-naphthalic acid-4'.6'.-dimethyl-phenylimide of the formula:

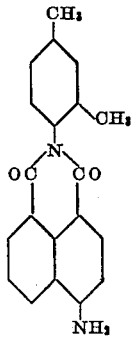

6. Cellulose esters and ethers dyed with a compound of the general formula:

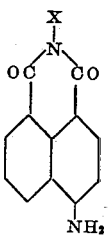

wherein X stands for hydrogen, alkyl, aralkyl or an isocyclic hydrocarbon residue.

7. Cellulose esters and ethers dyed with a compound of the general formula:

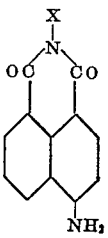

wherein X stands for alkyl or aryl.

8. Cellulose esters and ethers dyed with a compound of the general formula:

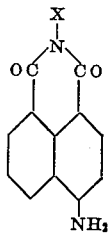

wherein X stands for alkyl or phenyl.

9. Cellulose esters and ethers dyed with a compound of the general formula:

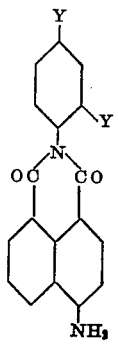

wherein Y stands for hydrogen or $CH_3$.

10. Cellulose esters and ethers dyed with a compound of the formula:

In testimony whereof, we affix our signatures.

WILHELM ECKERT.
CARL ERICH MÜLLER.